United States Patent
Howack et al.

(10) Patent No.: US 10,601,294 B2
(45) Date of Patent: Mar. 24, 2020

(54) LINEAR STEPPER MOTOR, DEVICE AND METHOD FOR MANUFACTURING THE LINEAR STEPPER MOTOR

(71) Applicant: Johnson Electric S.A., Murten (CH)

(72) Inventors: Gerd Howack, Kreischa (DE); Daniel Gerhard Barthel, Kiel (DE); Andreas Kurtz, Glasshütte (DE); Günter Albrecht, Dresden (DE)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 139 days.

(21) Appl. No.: 15/871,582

(22) Filed: Jan. 15, 2018

(65) Prior Publication Data
US 2018/0226871 A1    Aug. 9, 2018

(30) Foreign Application Priority Data
Feb. 9, 2017   (DE) .................. 10 2017 102 630

(51) Int. Cl.
*H02K 41/03* (2006.01)
*F16K 31/04* (2006.01)
*H02K 7/08* (2006.01)
*F16K 31/06* (2006.01)
*H02K 15/02* (2006.01)
(Continued)

(52) U.S. Cl.
CPC .......... *H02K 41/03* (2013.01); *F16K 31/047* (2013.01); *F16K 31/06* (2013.01); *H02K 5/1732* (2013.01); *H02K 7/06* (2013.01); *H02K 7/085* (2013.01); *H02K 7/086* (2013.01); *H02K 15/00* (2013.01); *H02K 15/022* (2013.01); *H02K 15/14* (2013.01); *H02K 5/15* (2013.01); *H02K 37/14* (2013.01)

(58) Field of Classification Search
CPC .......... H02K 41/03; H02K 15/02; H02K 7/08; H02K 5/1732; H02K 7/06; H02K 15/00; H02K 7/086; H02K 7/085; H02K 15/022; H02K 37/14; H02K 5/15; H02K 15/14; F16K 31/04; F16K 31/06; F16K 31/047
See application file for complete search history.

(56) References Cited

U.S. PATENT DOCUMENTS 6,157,103 A   12/2000  Ohta et al.
7,064,464 B2   6/2006  Ickinger
(Continued)

FOREIGN PATENT DOCUMENTS

CN   205123524 U   3/2016
CN   205681267 U   11/2016
(Continued)

*Primary Examiner* — Naishadh N Desai
(74) *Attorney, Agent, or Firm* — Muncy, Geissler, Olds & Lowe, PC

(57) ABSTRACT

A linear stepper motor includes a stator, a rotor, a cover and a longitudinally displaceable actuating rod. The stator is formed as a fully overmoulded stator assembly. The stator assembly includes a stator overmould. The rotor is received in the stator and includes a spindle. The cover is coupled to the stator assembly on the drive side of the linear stepper motor. The actuating rod is guided by the stator assembly. The spindle is only supported by its tips between two bearing balls between a stator recess of the stator overmould and a cover recess in the cover. A device and a method for manufacturing the linear stepper motor are also provided.

10 Claims, 3 Drawing Sheets

(51) Int. Cl.
$H02K\ 7/06$ (2006.01)
$H02K\ 5/173$ (2006.01)
$H02K\ 15/00$ (2006.01)
$H02K\ 15/14$ (2006.01)
$H02K\ 37/14$ (2006.01)
$H02K\ 5/15$ (2006.01)

(56) References Cited

U.S. PATENT DOCUMENTS

| | | | |
|---|---|---|---|
| 2004/0135448 A1* | 7/2004 | Matsushita | F16C 19/163 |
| | | | 310/90 |
| 2007/0290568 A1 | 12/2007 | Ihle et al. | |
| 2008/0088209 A1* | 4/2008 | Ryu | H02K 7/06 |
| | | | 310/49.01 |
| 2008/0130310 A1* | 6/2008 | Pfister | H02K 7/06 |
| | | | 362/528 |
| 2013/0056660 A1* | 3/2013 | Roby | F01P 7/14 |
| | | | 251/129.11 |
| 2017/0302133 A1* | 10/2017 | Ehrsam | F04D 29/426 |

FOREIGN PATENT DOCUMENTS

| | | |
|---|---|---|
| DE | 10332389 | 3/2005 |
| DE | 102005055868 | 6/2008 |
| DE | 102008054330 | 5/2010 |
| EP | 1496600 A2 | 1/2005 |
| EP | 1414636 B1 | 12/2009 |
| EP | 1928074 B1 | 9/2011 |
| EP | 2658088 A2 | 10/2013 |
| JP | 2003284281 A | 10/2003 |
| JP | 2007325327 A | 12/2007 |

* cited by examiner

LINEAR STEPPER MOTOR, DEVICE AND METHOD FOR MANUFACTURING THE LINEAR STEPPER MOTOR

CROSS REFERENCE TO RELATED APPLICATIONS

This non-provisional patent application claims priority under 35 U.S.C. § 119(a) from Patent Application No. 102017102630.4 filed in Germany on Feb. 9, 2017.

FIELD OF THE INVENTION

The invention relates to a linear stepper motor as well as a device and method for manufacturing a linear stepper motor.

BACKGROUND OF THE INVENTION

Such linear motors usually have ball bearings or plain bearings for radial support and for dissipating the radial forces. The requirement for these linear stepper motors is to be able to position the actuating rod as precisely as possible both radially and axially, i.e. specifically the axial play of the spindle relative to the spindle nut and the axial play of the whole spindle in the housing should be as small as possible. As a rule, total axial plays ≥0.3 mm are pursued. This requires very small tolerances of the components in manufacture. Added to this, under cool temperatures, the stator contracts much more than the spindle mounted in its interior. Therefore, a maximal axial play must be maintained so that the spindle does not jam in cool temperatures, otherwise the actuating force of the linear stepper motor can decline significantly.

A generic linear stepper motor is known from DE 103 32 389 A1, where the outer web ends of the actuating rod of this linear drive are of such a length that they can be fitted through corresponding guide cut-outs of the D-side bearing shield. After fitting through, a coupling shank that closes the web ends of the actuating rod is fitted and suitably fixed. The housing is bounded by two bearing shields, where two plain bearings for radial support and two balls for axial support of the spindle are arranged in both bearing shields by means of plain bearing journals of appropriate length. A problem here is the wobbling movement of the bell-shaped rotor induced by the two plain bearings and the precise adjustment of axial play.

According to EP 1 414 636 B1 an electro-mechanical linear drive with electric motor, having a hollow shaft rotor open on one side and a helical gear located in the interior of the hollow shaft rotor and converting the rotational movement of the hollow shaft rotor into a linear movement, operates a spindle shaft, wherein the rod-shaped end of a sleeve-shaped spindle nut protrudes from the open D-side of the linear drive.

EP 1 928 074 B1 describes a linear actuator comprising a common motor design in a separate two-piece housing with internal rotor with rotor shaft, a stator with coil, the rotor being radially and axially supported by a bearing on the motor side. Directly following the rotor shaft a threaded shank is formed on which a screw-nut system is arranged for producing a linear movement. This linear displacement unit is designed as a fork shape and consists of a nut portion and a coupling portion for its connection with a unit to be controlled. Furthermore, the motor shaft is axially supported by two balls, the balls bearing against separately formed hard stops. Moreover, this design additionally has a spring arranged in a bearing intended to prevent axial play of the rotor shaft with the following spindle. This design is characterised by a large number of components and has a relatively long structure.

Another linear drive with a claw-pole stepper motor is shown in DE 10 2008 054 330 A1, where the motor housing is also a radially split two-piece design. After assembly of the motor components, both motor housing halves can be locked and positioned against each other by means of bayonet joint. In this drive solution, too, the linear motor consists of an elevated number of components. To provide radial support, two radial grooved ball bearings are internally mounted.

DE 10 2005 055 868 B4 describes another threaded drive for a linear servo-motor with a flanged two-piece housing, designed as a very short structure, since the threaded spindle is supported and guided by two ball bearings inside the linear servo-motor. However, this motor also consists of a relatively large number of components, which makes its manufacture unnecessarily costly.

SUMMARY OF THE INVENTION

The task is to create a novel linear stepper motor, a device and a method for manufacturing, which allows tightly limited axial play, is designed to be simple and short and can be manufactured cost-efficiently in a fully automated manner.

A linear stepper motor includes a stator, a rotor, a cover and a longitudinally displaceable actuating rod. The stator is formed as a fully overmoulded stator assembly. The stator assembly includes a stator overmould. The rotor is received in the stator and includes a spindle. The cover is coupled to the stator assembly on the drive side of the linear stepper motor. The actuating rod is guided by the stator assembly. The spindle is only supported by its tips between two bearing balls between a stator recess of the stator overmould and a cover recess in the cover.

A device for manufacturing the linear stepper motor includes a base plate, a linearly displaceable shroud ring, an adjusting ring and a pressure die. The base plate has a central mandrel connected centrically with the base plate. The shroud ring surrounds and is supported on the central mandrel, an upper inner orifice of the shroud ring is configured for matching to an outer contour of the stator assembly, for receiving the linear stepper motor. The adjusting ring encircles the shroud ring, being movable in a longitudinal direction of the central mandrel and capable of being fixed on the shroud ring. The adjusting ring is supported against the base plate by a spring. The pressure die is centrically positioned above the shroud ring, for pressing the cover onto the stator assembly.

A method for using the device to produce the linear stepper motor, includes steps of: assembling the stator assembly, the rotor, the spindle, the actuating rod, the bearing balls and the cover, with the cover loosely covering the stator assembly; inserting the stator assembly into the upper inner orifice of the device; pressing the cover against the stator assembly by the pressure die, such that the cover is deflected inwards; and the linear stepper motor being relaxed and then the cover being tightly connected to the stator assembly, or the cover being tightly connected to the stator assembly and then the manufactured linear stepper motor being relaxed.

BRIEF DESCRIPTION OF THE DRAWINGS

The invention shall be explained in detail using exemplary embodiments. Of the accompanying drawings.

DETAILED DESCRIPTION OF THE PREFERRED EMBODIMENTS

Figure 1:
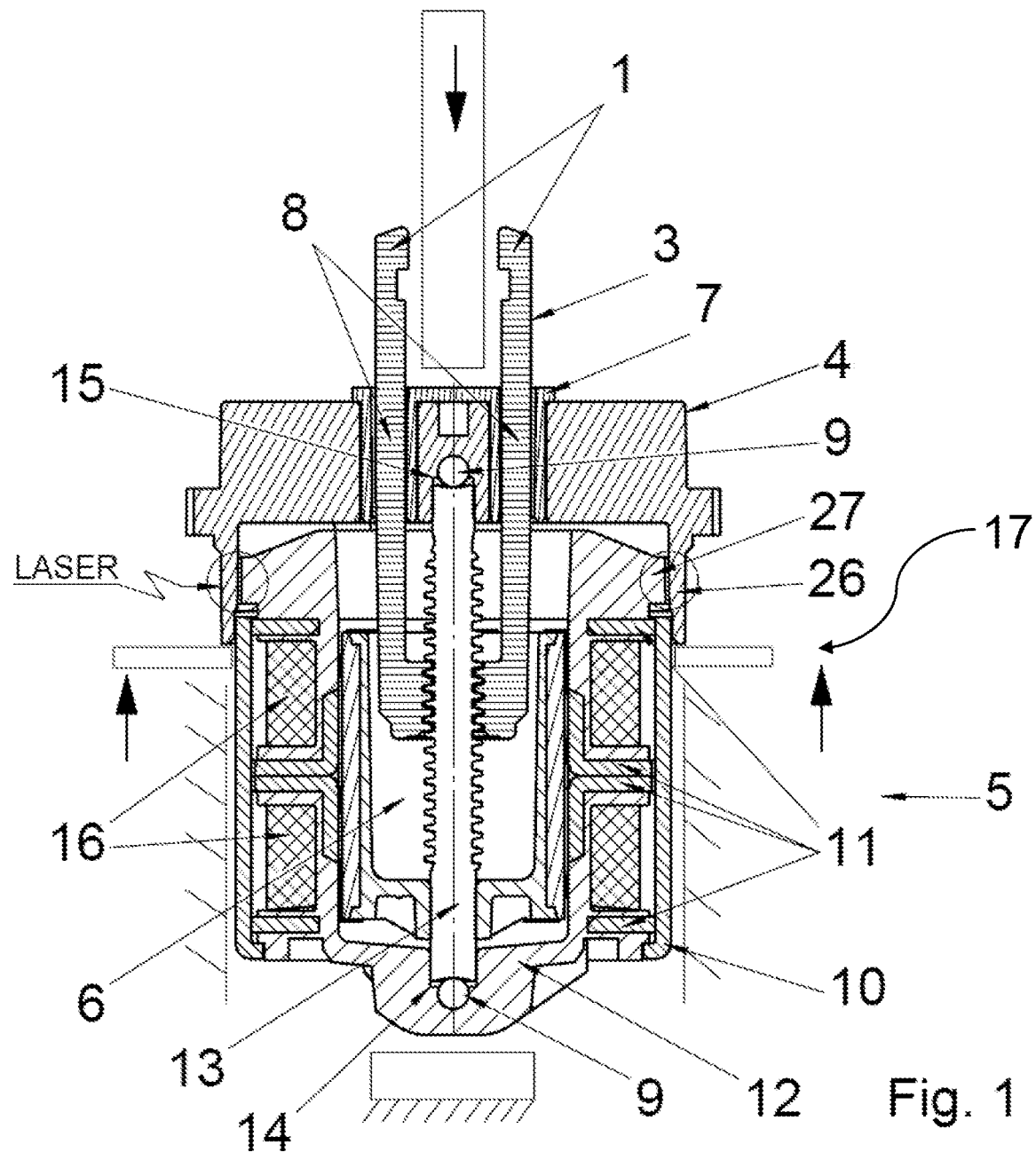
FIG. 1 shows a sectional view of a linear stepper motor according to the invention.

FIG. 1 shows the construction of the linear stepper motor. The stator assembly 17 is prefabricated separately. The stator assembly 17 includes a bell-shaped stator 5 and an associated bell-shaped rotor 6. In the bell-shaped rotor 6, a rotor shaft provided with a male thread is arranged and formed as a spindle 13. The spindle 13 transmits its rotary movement into a linear movement of the actuating rod 1 by means of a threaded hole arranged at the inner end of the longitudinally displaceable actuating rod 1. The actuating rod 1 is formed of two opposing parallel webs, and the webs connect to each other at one end. The parallel webs form an actuating rod fork 3, which is guided against rotation on the drive side (D-side) of the linear stepper motor through two openings 8 corresponding recessed in the cover 4. On the actuating rod fork 3, an actuating rod head 2 (FIG. 2) is formed to which different customer-specific attachments such as water valves can be simply coupled. The stator 5 is formed as a separate fully plastic overmoulded stator assembly 17 and has an integrally moulded stator flange 27 of a specific diameter. In the region between the overmoulded stator sheets, two stator windings 16 are wound and arranged. The stator windings 16 are configured to be electrically connectable to the exterior via connector pins 19 inserted into the stator overmould 12. The stator overmould 12 with the stator windings 16 is surrounded by a metallic stator sleeve 10 to form a magnetic return path, which is conductively contacted with the stator sheets 11 and which has a sleeve opening in which the connector boot 18 is mounted, surrounding the connector pins 19. The spindle 13 of the linear stepper motor is axially guided and supported between two bearing balls 9, i.e. two ends of the spindle 13 are respectively supported by two bearing balls 9 between a stator recess 14 of the stator overmould 12 and a cover recess 15 in the cover 4. The cover 4 is connected with the stator assembly 17 by a cover flange 26. The cover 4 is welded to the stator in the region of the contact surfaces of the two flanges 26 and 27 by means of a laser through the laser-transparent cover flange 26.

Figure 2:
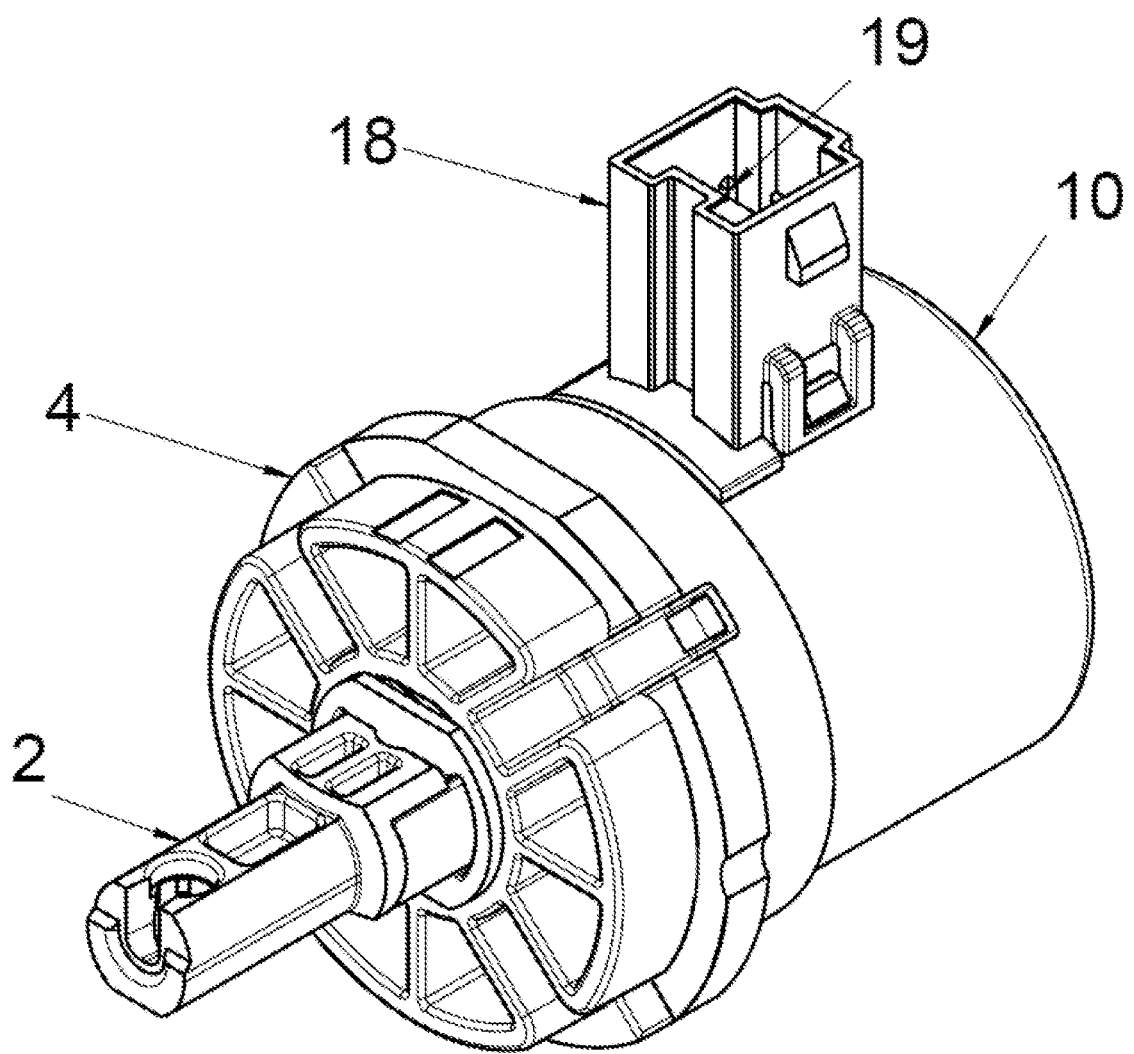
FIG. 2 shows a fully assembled linear stepper motor according to the invention.

FIG. 2 shows a fully assembled linear stepper motor in its entirety in an oblique view. This shows the especially short construction with a relative long displacement. This is possible by the special design configuration of the bell-shaped stator 5 and the bell-shaped rotor 6 with internal spindle 13 and with the spindle 13 supported only between two bearing balls 9.

Figure 3:
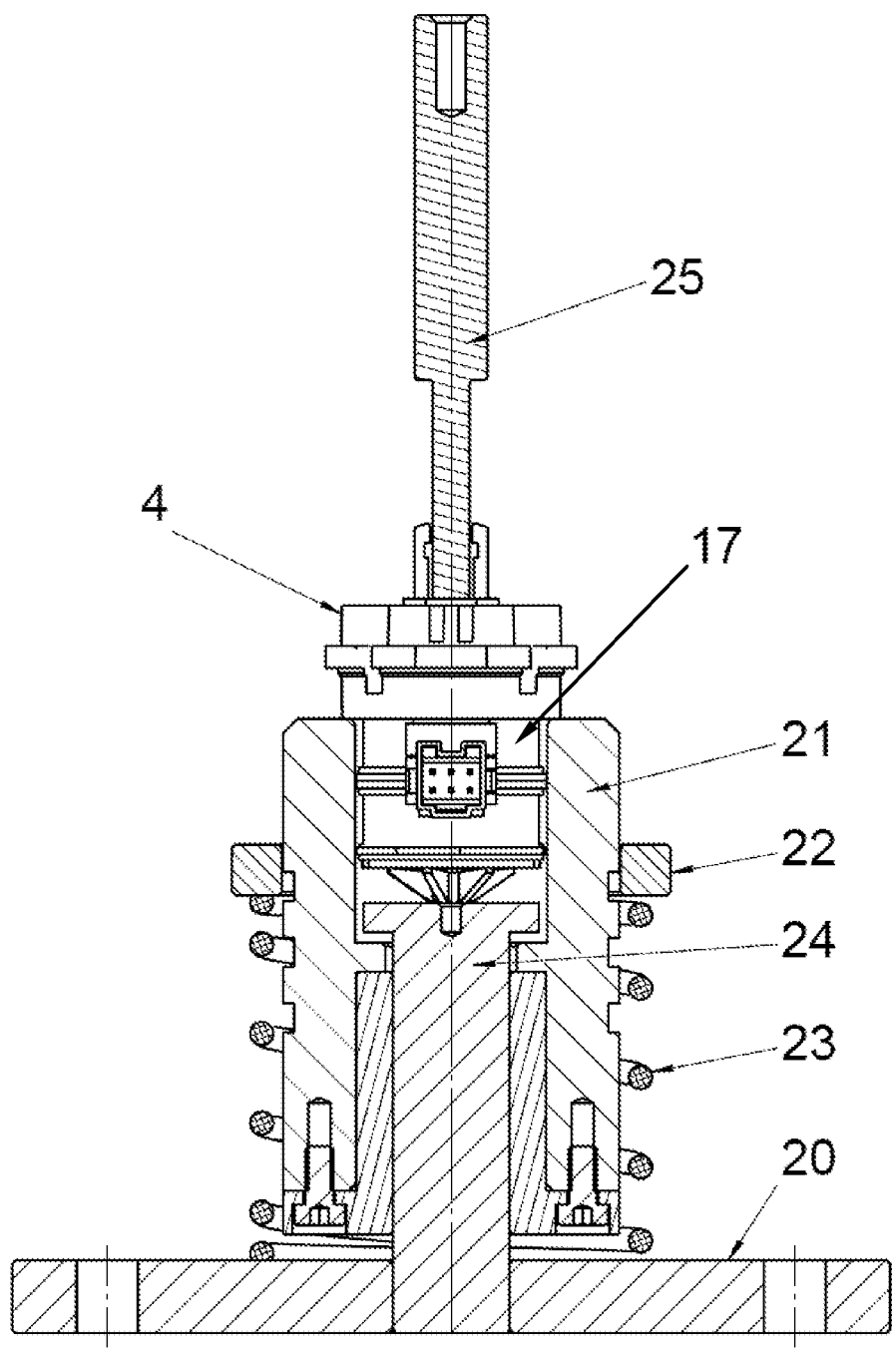
FIG. 3 shows a sectional view of a device for manufacturing a linear stepper motor.

FIG. 3 shows a sectional view of a device for manufacturing a linear stepper motor according to the invention with a placed linear motor (shown not sectioned). The device includes a stable base plate 20. Centrically in it, a central mandrel 24 is coupled to the base plate 20. Supported on the central mandrel 24 by means of a linear ball bearing 29 is a shroud ring 21 so that it is positioned and guided on the central mandrel 24 in a linearly displaceable manner. The form and inner dimensions of the upper inner orifice of the shroud ring 21 and the outer contour and housing dimensions of the stator assembly 17 are matched to each other such that the stator assembly 17 can be inserted into the inner orifice. The shroud ring 21 is encircled by an adjusting ring 22 which is movable in height on the central mandrel 24 and can be fixed on it. The adjusting ring 22 is supported against the base plate 20 preferably by an annular spring 23 with a specific spring constant. The rotor 6, the spindle 13 with the pre-assembled actuating rod 1 and the bearing balls 9 are inserted into the stator 5, and the cover 4 is plugged on. Centrically arranged is a pressure die 25 controlled by a force sensor, pressing the cover 4 onto the stator assembly 17 from the top and thus pressing the whole linear stepper motor onto the shroud ring 21. Instead of a pressure die controlled by a force sensor, it is also possible to have a spring-controlled pressure die. The pressure die 25 controlled by a force sensor or a spring transmits an optimal force onto the mounted linear motor until the cover 4 and the lower part of the stator overmould 12 sitting on the face of the pressure die 25 have deflected in the region of the bearings so that no air gap is present anymore. The end face of the pressure die 25 is aligned exactly at right angles to the symmetry axis of the whole device. At this moment the pressure die 25 controlled by a force sensor or a spring exhibits a sharp increase of pressure force to be applied and the device is switched off and relaxed. The deflections can now relax in the region of the supported bearings, setting the optimal axial play.

Details of the embodiment are as follows. The linear stepper motor according to the invention, which consists of a separately pre-fabricated stator assembly 17 of a bell-shaped stator 5 and an associated bell-shaped rotor 6, and a longitudinally displaceable fork-shaped actuating rod 1 guided in the stator assembly 17 for transmitting actuating movement of the linear stepper motor. In the bell-shaped rotor 6, a rotor shaft with a male thread is positioned and formed as spindle 13. The spindle 13 transmits its rotary movement into a linear movement of the actuating rod 1 by means of a threaded hole arranged at the inner end of the longitudinally displaceable actuating rod 1. The actuating rod 1 is formed of two opposing parallel webs, and the webs connect to each other at one end. These parallel webs form an actuating rod fork 3 which is guided against rotation on the drive side (D-side) of the linear stepper motor through two openings 8 corresponding recessed in the cover 4. On the actuating rod fork 3 an actuating rod head 2 is formed to which different customer-specific attachments such as water valves can be coupled simply. The stator 5 is fully formed as a stator assembly 17 in one plastic overmoulding operation and has an integrally moulded stator flange 27 of a specific diameter. On the stator overmould 12, stator windings 16 are wound between stator sheets 11 and connected with inserted connector pins 19. The stator overmould 12 is surrounded by a metallic stator sleeve 10 to form a magnetic return path, which is conductively contacted with the stator sheets 11 and which has a sleeve opening in which the connector boot 18 with the connector pins 19 is mounted. The spindle 13 of the linear stepper motor is axially guided and supported between two bearing balls 9, e.g. it is supported at its pointed tip by two bearing balls 9 between a stator recess 14 of the stator overmould 12 and a cover recess 15 in the cover 4.

In contrast to previous linear stepper motors, there are no separately arranged plain bearings or roller bearings, but the spindle 13 is guided only directly in the stator overmould 12. This facilitates the construction and assembly and can also reliably prevent rotor wobbling during operation. Additionally, this simplified construction achieves very good concentricity of the stator 5 and the rotor 6.

The novel device for manufacturing the linear stepper motor consists of a stable base plate 20 with a central mandrel 24 connected centrically with the base plate 20. Supported on the central mandrel 24 is a shroud ring 21 which is positioned and guided on the central mandrel 24 in a linearly displaceable manner. The form and inner dimensions of the upper inner orifice of the shroud ring 21 and the outer contour and housing dimensions of the stator assembly 17 are matched to each other such that the stator assembly 17 can be inserted into the inner orifice. The shroud ring 21 is encircled by an adjusting ring 22 which is movable in height on the central mandrel 24 and can be fixed on it or is formed or arranged on it in a fixed manner. The adjusting ring 22 is supported against the base plate 20 by a spring 23. The rotor 6, the spindle 13 with the pre-assembled actuating rod 1 and the bearing balls 9 are fitted into the stator 5, and the cover 4 is plugged on. Centrically arranged is a force-controlled pressure die 25, pressing the cover 4 onto the stator assembly 17 from the top and thus pressing the whole linear stepper motor onto the shroud ring 21. The metallic stator sleeve 10 can also be pre-fitted.

In the method for manufacturing a linear stepper motor by means of the device described above, the stator assembly 17 consisting of two or more joined stator sheets and provided as an entity with a one-piece stator overmould 12, together with a fitted stator winding 16 and/or the surrounding metallic stator sleeve 10, which makes the stator 5 to be bell-shaped and on which a stator flange 27 is formed, is inserted into the upper inner orifice of the linearly displaceable shroud ring 21. The connector pins 19 and the connector boot 18 can also be already contacted and mounted. Subsequently, the assembly is completed with the other motor components, the bearing ball 9, the rotor 6, the spindle 13 and the actuating rod 1, the cover 4 in which the second bearing ball 9 is placed. Then the assembly is placed, the cover flange 26 is adjusted and the flanges 26 and 27 are fitted to each other by pressure exerted by a force-controlled pressure die 25. The final position of the flanges 26 and 27 is reached by the lower outer area of the stator assembly 17 hitting the face of the central mandrel 24 and then pressing is continued until the force sensor reaches a specific limit. In the pressing operation, both the cover 4 and the opposite region of the overmoulded stator 5 are depressed so far that they deflect slightly inwards, i.e. the cover deflects somewhat more. If no air gaps remain between the components, i.e. the axial plays have been eliminated, the pressure die 25 exhibits a sharp increase of pressure force. At this moment it is switched off and the device is removed. The cover 4 relaxes, forming a small air gap between the bearing balls 9 and the axial bearing surfaces of the spindle 13, which represents the axial play. However, pressure force can remain applied to the cover 4 until after joining. In the region of the cover flange 26, the cover 4 is joined with the stator flange 27 in a suitable manner, preferably the cover flange 26 and the stator flange 27 are welded together. This method permits automated assembly and manufacture of a linear stepper motor and highly precise adjustment of axial play so that the spindle 13 can almost make no more axial movements. This permits manufacturing of each linear stepper motor with a minimised and at once optimally required axial play despite significant component tolerances.

The device for manufacturing a linear stepper motor is preferably designed such that the linearly displaceable shroud ring 21 is guided and supported on the central mandrel 24 by means of a linear ball bearing 29 to minimise friction between both components.

The method for manufacturing a linear stepper motor can be optimised if, by using a specific laser, the cover 4 of which at least the region of the cover flange 26 is partly of a laser-transparent plastic material is materially bonded there through with the stator flange 27 along the radial circumference in the press-fit region during a rotating movement of the device, or in case of a fixed device by using a revolving laser or in case of a fixed device by using several lasers. Welding only occurs internally in the immediate region of the two inner contact surfaces of the cover flange 26 and the stator flange 27.

It is crucial for high dimensional precision that the cover 4 is automatically aligned at a right angle to the stator axis (symmetry axis) because the top surface of the shroud ring 21 is also exactly at right angles to the symmetry axis of the shroud ring orifice.

Although the linear motor consists of fewer components than previously known, it is maintenance-free and of a very short structure, meets the high requirements for minimal axial play of the spindle 13 and can be manufactured easily and fast by this method. The previously used costly ball bearing or plain bearing is eliminated, avoiding the wobbling of a later mounted rotor 6 caused by it. The axial play can be precisely adjusted for each linear motor depending on the length of the spindle 13 only by changing the preload of the annular spring 23. This is a significant advantage, notably because the individual tolerances of the three parts to be connected with each other, the length of the spindle 13, the depth of the stator recess 14 and the depth of the cover recess 15 may vary within considerable limits. Due to these tolerances, axial gaps smaller than ±0.05 mm on bearings cannot be produced economically and inexpensively. Since now the component tolerances and particularly the varying spindle length no longer affect the process of axial play adjustment, the manufacturing expense can be significantly reduced. The axial play in the spindle bearings is optimally precision-adjustable for each built-in spindle, such as e.g. 0.03 mm of minimal axial gap and 0.07 mm of maximal axial gap for specific sizes.

The invention claimed is:

1. A linear stepper motor comprising:
a stator formed as a fully overmoulded stator assembly, the stator assembly comprising a stator overmould;
a rotor received in the stator and comprising a spindle;
a cover coupled to the stator assembly on the drive side of the linear stepper motor; and
a longitudinally displaceable actuating rod guided by the stator assembly, wherein the spindle is only supported by its tips between two bearing balls between a stator recess of the stator overmould and a cover recess in the cover, and wherein the cover of the linear stepper motor comprises a cover flange made of a laser-transparent plastic material, the stator overmould comprises a stator flange laser-welded to the cover flange.

2. The linear stepper motor of claim 1, wherein the actuating rod is fork-shaped and comprises two opposing parallel webs connecting to each other at one end, the cover defines two opposite openings, and the webs of the actuating rod are guided through the two openings in the cover in a rotation-locked manner.

3. The linear stepper motor of claim 1, wherein the spindle is provided with male threads, and the actuating rod defines a threaded hole engaging with the male threads of the spindle.

4. A device for manufacturing a linear stepper motor, the linear stepper motor comprising a stator assembly with a stator, a rotor received in the stator, a longitudinally displaceable actuating rod guided by the stator assembly, and a cover coupled to the stator assembly on a drive side of the linear stepper motor, the rotor comprising a spindle, the stator being formed as a fully overmoulded stator assembly, the stator assembly comprising a stator overmould, the spindle being only supported by its tips between two bearing balls between a stator recess of the stator overmould and a cover recess in the cover, the device comprising:

a base plate having a central mandrel connected with the base plate;

a linearly displaceable shroud ring surrounding and supported on the central mandrel, an upper inner orifice of the shroud ring configured for matching to an outer contour of the stator assembly, for receiving the linear stepper motor;

an adjusting ring encircling the shroud ring, movable in a longitudinal direction of the central mandrel and capable of being fixed on the shroud ring, the adjusting ring being supported against the base plate by a spring; and a pressure die centrically positioned above the shroud ring, for pressing the cover onto the stator assembly.

5. The device of claim 4, wherein the pressure die is controlled by a force sensor or a spring, to transmit an optimal force onto the cover.

6. The device of claim 4, wherein an end face of the pressure die is aligned at right angles to a symmetry axis of the shroud ring.

7. The device of claim 4, wherein the linearly displaceable shroud ring is guided and supported on the central mandrel by a linear ball bearing.

8. A method for using a device to produce a linear stepper motor, the linear stepper motor comprising a stator assembly with a stator, a rotor received in the stator, a longitudinally displaceable actuating rod guided by the stator assembly, and a cover coupled to the stator assembly on a drive side of the linear stepper motor, the rotor comprising a spindle, the stator being formed as a fully overmoulded stator assembly, the stator assembly comprising a stator overmould, the spindle being only supported by its tips between two bearing balls between a stator recess of the stator overmould and a cover recess in the cover; the device comprising: a base plate having a central mandrel connected with the base plate; a linearly displaceable shroud ring surrounding and supported on the central mandrel, an upper inner orifice of the shroud ring configured for matching to an outer contour of the stator assembly, for receiving the linear stepper motor; an adjusting ring encircling the shroud ring, movable in a longitudinal direction of the central mandrel and capable of being fixed on the shroud ring, the adjusting ring being supported against the base plate by a spring; and a pressure die centrically positioned above the shroud ring, for pressing the cover onto the stator assembly, the method comprising:

assembling the stator assembly, the rotor, the spindle, the actuating rod, the bearing balls and the cover, with the cover loosely covering the stator assembly;

inserting the stator assembly into the upper inner orifice of the device;

pressing the cover against the stator assembly by the pressure die, such that the cover is deflected inwards; and the linear stepper motor being relaxed and then the cover being tightly connected to the stator assembly, or the cover being tightly connected to the stator assembly and then the manufactured linear stepper motor being relaxed.

9. The method of claim 8, wherein the cover of the linear stepper motor comprises a cover flange, the stator assembly comprises a stator flange, the cover and the stator assembly are connected by welding the cover flange to the stator flange.

10. The Method of claim 9, wherein the cover is partly made of a laser-transparent plastic material in the region of the cover flange, the cover flange is laser-welded to the stator flange along a radial circumference during a rotating movement of the linear stepper motor, or by using a revolving laser, or by using a plurality of lasers.

\* \* \* \* \*